Patented Oct. 8, 1946

2,409,109

UNITED STATES PATENT OFFICE 2,409,109

DIARYL GUANIDINE ADDITION PRODUCTS

Arnold Rogers Davis, Riverside, Conn., assignor to American Cyanamid Company, New York, N. Y., a corporation of Maine No Drawing. Application August 7, 1944, Serial No. 548,497

5 Claims. (Cl. 260—306.6)

1

This invention relates to a group of new chemical products. More particularly, the invention relates to a series of chemical compounds which constitute addition products of a diarylguanidine and a zinc salt of a mercaptan or a dithiocarbamic acid.

These new products are variously useful but, in particular, are adapted for use in vulcanization of rubber, both natural and synthetic. Both the diarylguanidines and mercaptans and dithiocarbamic acids are known. These have been previously used in vulcanization, for example, the diarylguanidines and the zinc salt of mercaptobenzothiazole, as well as the dithiocarbamates have been used in conjunction with each other to obtain results which could not be obtained using these agents alone. The present group of new chemical combines both types of agent into a single compound, having the advantage that a plurality of agents need not be used by the industry to obtain the desired results. The present application relates to the new products, per se, vulcanization processes using the same being set forth in my copending application for United States Letters Patent, Serial No. 548,498, filed of even date.

The new compounds of the present invention are most simply described as reaction products which may be designated by the formula $A_xZn(B)_2$. A represents such diaryl guanidines as diphenyl guanidine, ditolyl guanidines, particularly the diorthotolyl guanidine, the dixylyl guanidines, dinaphthyl guanidine, and the like. In the present invention $x$ represents the integers 1 and 2. The group designated as B may be quite widely varied since $Zn(B)_2$ represents salts of both marcaptans and dithiocarbamic acids. In this group are such compounds as the zinc salts of mercaptobenzothiazole, the dialkyl dithiocarbamic acids such as the dimethyl, diethyl, dibutyl and bis-alkoxyalkyl; the alkyl, aryl dithiocarbamic acids such as the N,N-propyl, phenyl and N,N-butyl, phenyl, dithiocarbamic acids and the like.

The proportions in which the diaryl guanidine and the zinc salt are combined may be quite widely varied. In general, however, it has been found preferable to use from one to two mol parts of the diaryl guanidine with one mol part of the zinc salt. The products may be readily produced by heating the reactants to the fusion point and continuing the heating until reaction is complete. Alternatively, the reaction may be carried out by suspending or dissolving diaryl guanidine in a volatile solvent such as benzene and carrying out

2 the reaction by gentle heating as on a steam bath. Products of the reaction may be either amorphous or crystalline, many of them appearing as clear resins and others as clear white crystals. Whichever the form in which the product is obtained it has a fixed analysis, and in the case of the crystalline forms, a definite melting point, indicating that a true chemical compound is formed by the reaction and not simply a complex mixture.

The invention will be more fully illustrated in conjunction with the following examples which are intended to be illustrative only and not by way of limitation. All parts are by weight unless otherwise noted. In these examples the following abbreviations are used for the sake of simplification:

D. P. G.—diphenyl guanidine
D. O. T. G.—di-o-tolyl guanidine
D. X. G.—dixylyl guanidine
M. B. T.—mercaptobenzothiazole
D. T. C.—dithiocarbamic acid

Example 1

$(D. P. G.)_2Zn(M. B. T.)_2$ 199 parts of the zinc salt of mercaptobenzothiazole and 211 parts of diphenyl guanidine were heated together with stirring until they fused at about 110° C. A clear resin formed in a few minutes. The fusion product was held at 100–110° C. for about 15 minutes after which the melt was cooled, crushed, ground and remelted at about 100° C. A clear resin was formed.

Example 2

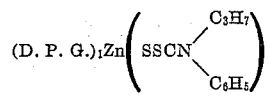

485 parts of zinc N,N-n-propyl, phenyl dithiocarbamate and 211 parts of diphenyl guanidine were fused together and held at 95–100° C. for about 15 minutes. A clear liquid form which, on cooling, gave a clear resin.

Example 3

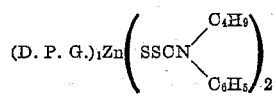

The process of Example 2 was repeated, using 513 parts of zinc N,N-n-butyl, phenyl dithiocarbamate and 211 parts of diphenylguanidine. As in Example 2, a clear liquid was formed which give a clear film on cooling.

EXAMPLE 4

(D. P. G.)Zn(M. B. T.)₂

The procedure of Example 1 was repeated, using 199 parts of the zinc mercaptobenzothiazole and 106 parts diphenylguanidine. The mass fused at 125–130° C. and after being cooled, crushed, and ground, melted at about 130° C. The product was a light brownish-yellow resin.

EXAMPLE 5

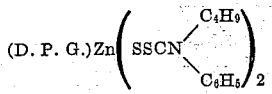

513 parts of zinc butylphenyldithiocarbamate and 211 parts of diphenylguanidine were fused together for about 15 minutes at 95° C. A substantially water-white resin was formed.

EXAMPLE 6

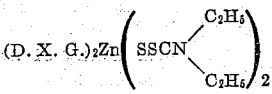

The procedure of Example 5 was repeated using 107 parts of dixylylguanidine and 73 parts of zinc diethyldithiocarbamate. After about one-half hour's heating at 100–105° C. a clear, resinous product was obtained.

EXAMPLE 7

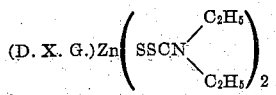

The procedure in Example 6 was repeated using half the quantity of zinc diethyldithiocarbamate. A similar appear resin was obtained.

EXAMPLE 8

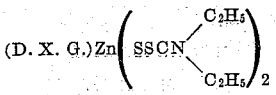

534 parts of dixylyl guanidine were added to a solution of 362 parts of zinc diethyldithiocarbamate in benzene at 30° C. The temperature was raised to 75–78° C. and held for about 40 minutes after which the solution was filtered, the filter washed with hot benzene and the washings added to the original filtrate. The filtrate was rapidly evaporated to about one quarter its original volume and then allowed to stand in air at room temperature. No crystals appeared even after long standing. The product is a soft resin.

EXAMPLE 9

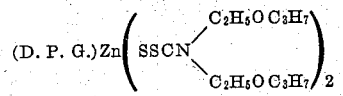

297 parts of zinc bis-ethoxypropyldithiocarbamate were fused together at about 100° C. with 211 parts of diphenyl guanidine, for a sufficient time to form a clear liquid. On cooling a thick light colored paste was formed indicating crystalline growth.

EXAMPLE 10

(D. O. T. G.)₂Zn(M. B. T.)₂

119 parts of zinc mercaptobenzothiazole and 143 parts of di-o-tolyl guanidine were fused together at 125° C. to give a clear melt which was cooled, crushed and ground and again heated at 125° C. for about 15 minutes, after which the fusion product was allowed to stand overnight. Optically, the product shows crystals differing from either di-o-tolyl guanidine or zinc mercaptobenzothiazole.

EXAMPLE 11

47.8 parts of di-o-tolyl guanidine were suspended in 500 parts of benzol and 39.8 parts of zinc mercaptobenzothiazole added thereto. Both materials dissolved on heating to about 78–80° C., the temperature being held at this point until about one-half the benzol was evaporated. On standing for about one hour, crystals formed and the mass solidified. About 250 parts of benzol were added to dissolve the crystals, the solution was filtered and cooled, crystals separated out, washed with benzol and dried in air for about 48 hours. The product was a homogeneous crystalline mass melting at 152–153° C. and having a nitrogen content of 12.30% and a sulfur content of 13.81%.

EXAMPLE 12

The same amounts of material used in Example 11 were fused together at 170° C. and heated at 153–155° C. until the melt was clear. A glassy amorphous product was obtained.

EXAMPLE 13

Example 11 was repeated using 51.3 parts of zinc N-propyl, phenyl dithiocarbamate and 42.2 parts of diphenyl guanidine. After 30 minutes of heating, the solution allowed crystals of the product to form when cooled.

EXAMPLE 14

Example 11 was repeated using 39.8 parts of zinc mercaptobenzothiazole and 47.8 parts of di-o-tolyl guanidine in 500 parts of benzol. A clear solution formed after about one-half hour at 70° C. Heating was continued for one hour, followed by filtration. On cooling, no crystals formed. About one-half the solvent was then evaporated. The crystals formed after evaporating part of the solvent were redissolved in benzol and recrystallized. The resultant crystals formed were washed twice in benzol and dried at 100° C. for about one hour. The crystalline product had a melting point of 155–157° C. and the following analysis:

| | | |
|---|---|---|
| N, % | 12.74 | 12.78 |
| S, % | 14.40 | 14.60 |
| Zn, % | 7.26 | 7.44 |

A second bath of crystals recovered from the mother liquor had the same melting point indicating that a uniform product was obtained.

EXAMPLE 15

A portion of zinc mercaptobenzothiazole was washed in hexane, benzol and acetone. 119.3 parts of washed salt was fused with 143.5 parts of di-o-tolyl guanidine at 125–104° C. After fusion the mass was cooled, ground and remelted, the temperature being held at 157° C. until reaction appeared to be complete, as evidenced by the clarity of the melt.

EXAMPLE 16

*Vulcanization in butyl rubber*

The product of Example 3 (D. P. G.)Zn(N,N-n-butyl, phenyl D. T. C.)₂ was made into the following composition by milling the components together:

| | |
|---|---|
| Butyl B (contains 5% ZnO, 1.5% sul.) | 106.5 |
| Stearic acid | 3 |
| Pelletex black | 40 |
| E. R. C. black | 10 |
| Accelerator | 1.0 |

After curing for 60 minutes at 153° C. the product was found to be a Shore Hardness of 44.

EXAMPLE 17

*Vulcanization of Buna S*

The same accelerator produced in Example 3 was made up into the following composition:

| | |
|---|---|
| Buna S | 100 |
| Coal tar softener | 5 |
| Zinc oxide | 5 |
| E. P. C. black | 50 |
| Sulfur | 2 |
| Above accelerator | 0.65 |

| Cure | | Modulus @ 300% | Tensile strength | Per cent elong. |
|---|---|---|---|---|
| Time, minutes | Temp., °C. | | | |
| 15 | 141 | 490 | 1,945 | 710 |
| 30 | 141 | 985 | 3,090 | 605 |
| 60 | 141 | 1,295 | 2,750 | 490 |

EXAMPLE 18

*Effect of varying proportions of diaryl guanidine on vulcanization*

In order to show the distinction between the use of diaryl guanidine in the ratio of 1 and 2 parts of diaryl guanidine per part of zinc salt, the following compositions were prepared and tested and the results shown in the table were obtained.

| | Compounds | |
|---|---|---|
| G. R.-S | 100 | 100 |
| Bardol (coal tar softener) | 5 | 5 |
| Zinc oxide | 5 | 5 |
| E. P. C. black | 50 | 50 |
| Sulfur | 2 | 2 |
| (D. P. G.)$_2$Zn(M. B. T.)$_2$ (From Example 1) | .89 | — |
| D. P. G.Zn(M. B. T.)$_2$ (From Example 4) | — | .90 |

| | 60' cure at 141° C. | |
|---|---|---|
| Shore hardness | 60 | 61 |
| Mod. at 300% | 1,070 | 755 |
| Tensile | 2,610 | 2,285 |
| Elongation | 535 | 590 |
| Torsional hysteresis "K" at 280° F | .180 | .184 |

EXAMPLE 19

*Comparison of solvent vs. fusion products*

In order to show that substantially the same results are obtained whether the products of the present invention are prepared by fusion or by the solvent process, the compositions shown in the following table were prepared and tested. It will be noted that substantially equivalent results were obtained.

| | Compounds | |
|---|---|---|
| G. R.-S | 100 | 100 |
| Bardol (coal tar softener) | 5 | 5 |
| Zinc oxide | 5 | 5 |
| E. P. C. black | 50 | 50 |
| Sulfur | 2 | 2 |
| (D. O. T. G.)$_2$Zn(M. B. T.)$_2$ (Ex. 14) | 0.90 | — |
| (D. O. T. G.)$_2$Zn (M. B. T.)$_2$ (Ex. 15) | — | 0.90 |

| | Cured 55 minutes at 141° C. | |
|---|---|---|
| Shore hardness (30″) | 61 | 59 |
| Mod. at 300% | 1,150 | 1,100 |
| Tensile | 3,050 | 2,950 |
| Elongation % | 580 | 600 |
| Set at break, % | 26 | 26 |
| Torsional hysteresis "K" at 280° F | .168 | .174 |
| DeMattra cut growth rate mils./kc | 33 | 27 |

I claim:

1. A reaction product of one to two mols of a diaryl-guanidine and one mol of a zinc salt having the formula Zn(X)$_2$ in which X represents a member of the group consisting of the

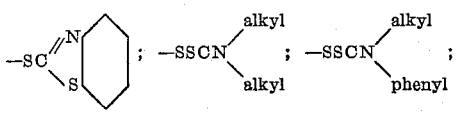

and

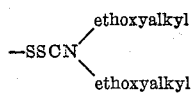

radicals.

2. A reaction product of one to two mols of a diaryl-guanidine and one mol of a zinc mercaptobenzothiazole.

3. A reaction product of one to two mols of diphenylguanidine and one mol of zinc mercaptobenzothiazole.

4. A reaction product of one to two mols of di-o-tolyl guanidine and one mol of zinc mercaptobenzothiazole.

5. A reaction product of one to two mols of dixylyl guanidine and one mol of zinc mercaptobenzothiazole.

ARNOLD ROGERS DAVIS.

Certificate of Correction

Patent No. 2,409,109.  October 8, 1946.

ARNOLD ROGERS DAVIS

It is hereby certified that error appears in the printed specification of the above numbered patent requiring correction as follows: Column 4, line 59, Example 15, for "125–104° C." read *125–140° C.*; and that the said Letters Patent should be read with this correction therein that the same may conform to the record of the case in the Patent Office.

Signed and sealed this 15th day of July, A. D. 1947.

[SEAL]

LESLIE FRAZER,
*First Assistant Commissioner of Patents.*